(12) United States Patent
Choi et al.

(10) Patent No.: US 10,724,493 B2
(45) Date of Patent: Jul. 28, 2020

(54) DEVICE FOR INCREASING TORQUE OF CRANKSHAFT PULLEY

(71) Applicants: HYUNDAI MOTOR COMPANY, Seoul (KR); KIA MOTORS CORPORATION, Seoul (KR); SAMBO MOTORS CO., LTD., Daegu (KR)

(72) Inventors: Kum Lim Choi, Seoul (KR); Hyun Chan Kim, Siheung-si (KR); Eun Je Seong, Suwon-si (KR)

(73) Assignees: Hyundai Motor Company, Seoul (KR); Kia Motors Corporation, Seoul (KR); Sambo Motors Co., Ltd., Daegu (KR)

( * ) Notice: Subject to any disclaimer, the term of this patent is extended or adjusted under 35 U.S.C. 154(b) by 199 days.

(21) Appl. No.: 15/986,248

(22) Filed: May 22, 2018

(65) Prior Publication Data

US 2019/0186453 A1   Jun. 20, 2019

(30) Foreign Application Priority Data

Dec. 20, 2017 (KR) .......................... 10-2017-0175880

(51) Int. Cl.
| | | |
|---|---|---|
| *F16H 15/22* | (2006.01) | |
| *F02N 15/02* | (2006.01) | |
| *F16H 57/029* | (2012.01) | |
| *F16H 3/54* | (2006.01) | |

(52) U.S. Cl.
CPC ......... *F02N 15/022* (2013.01); *F16H 57/029* (2013.01); *F16H 3/54* (2013.01); *F16H 2200/2005* (2013.01); *F16H 2200/2035* (2013.01); *F16H 2200/2064* (2013.01); *F16H 2200/2066* (2013.01); *F16H 2200/2082* (2013.01); *F16H 2200/2094* (2013.01)

(58) Field of Classification Search
CPC .................................. F16H 3/54; F16H 57/029
See application file for complete search history.

(56) References Cited

U.S. PATENT DOCUMENTS 7,028,794 B2 * 4/2006 Odahara .................. B60K 6/48
                                                              180/65.25

FOREIGN PATENT DOCUMENTS

KR         10-1632177 B1    6/2016

* cited by examiner

*Primary Examiner* — Derek D Knight
(74) *Attorney, Agent, or Firm* — Morgan, Lewis & Bockius LLP

(57) ABSTRACT

A device for increasing torque of a crankshaft pulley includes: a pulley surrounding a crankshaft and connected to engine accessories; a planetary gear set having first, second, and third rotary elements, wherein the rotary element is always fixed to the pulley, the second rotary element is always fixed to the crankshaft, and the third rotary element is operated as a selective fixed element; a one-way clutch disposed between the first rotary element and the second rotary element to transmit rotational force only in a direction from the first rotary element to the second rotary element; and a first bearing disposed between the crankshaft and the first rotary element.

5 Claims, 4 Drawing Sheets

[FIG. 1]
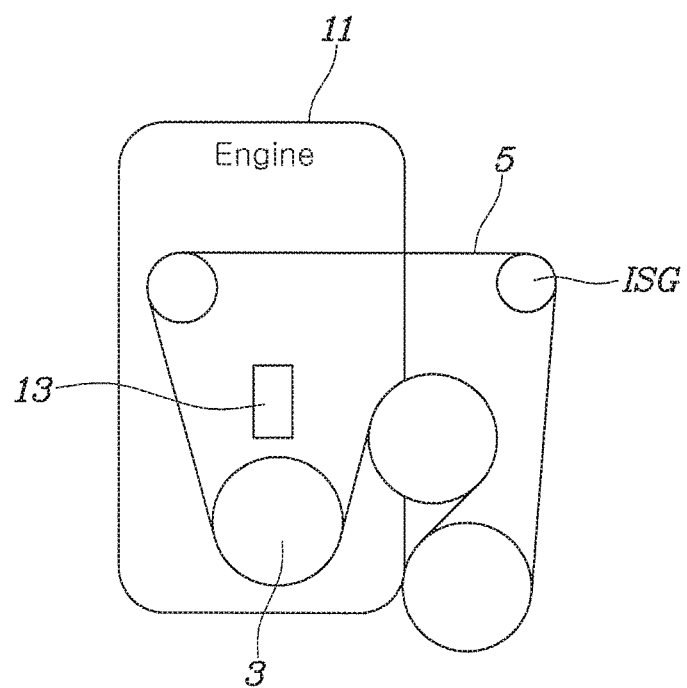

[FIG. 2]
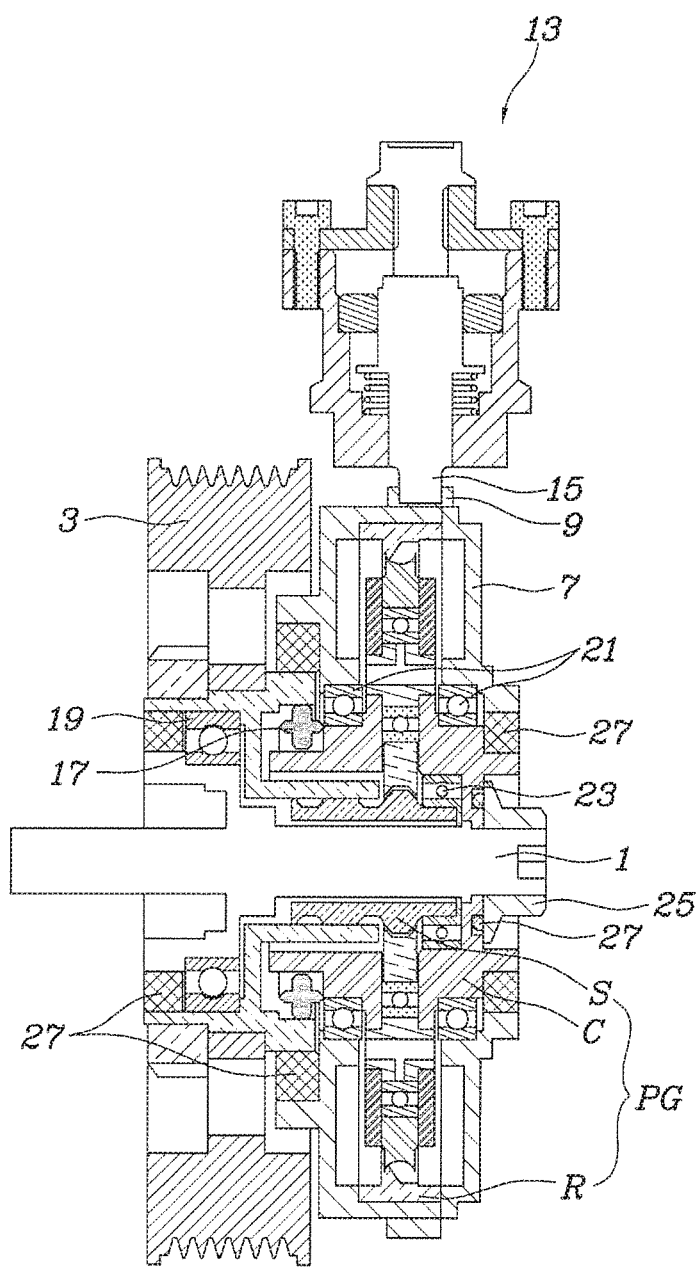

[FIG. 3]
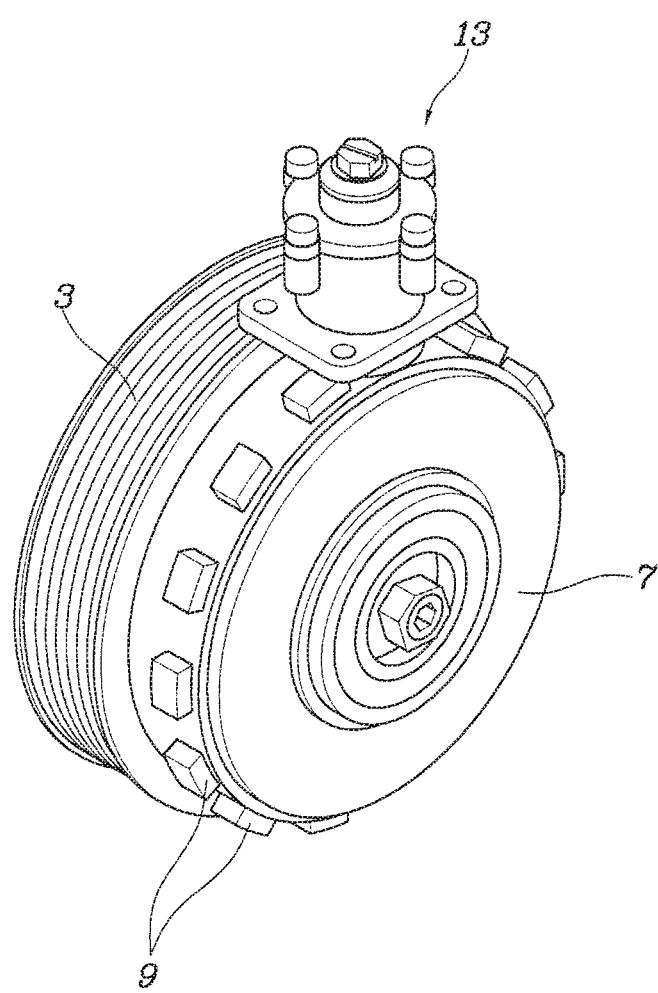

[FIG. 4]
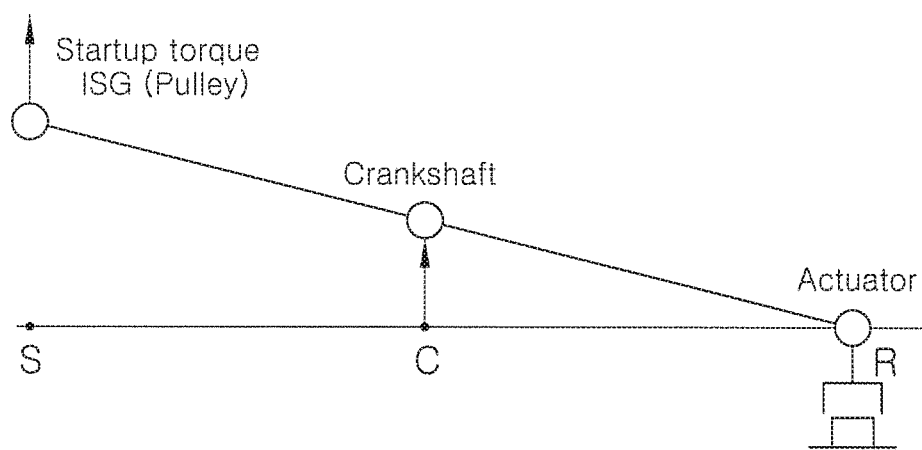
[FIG. 5]
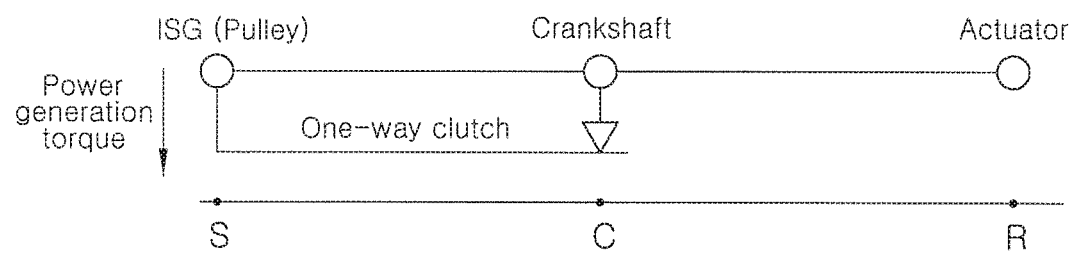

DEVICE FOR INCREASING TORQUE OF CRANKSHAFT PULLEY

CROSS REFERENCE TO RELATED APPLICATION

The present application claims the benefit of priority to Korean Patent Application No. 10-2017-0175880 filed on Dec. 20, 2017, the entire content of which is incorporated, herein for all purposes by this reference.

TECHNICAL FIELD

The present disclosure relates to a device for increasing torque of a crankshaft pulley that reduces rotational friction resistance during driving of an engine to prevent power generation efficiency from being decreased.

BACKGROUND

A crankshaft pulley is a pulley attached to an end of a crankshaft, which allows a belt to engage with it and serves to drive engine accessories such as a generator, a water pump, and a compressor.

A structure having a torque increasing device installed in a crankshaft pulley has been proposed. In this case, a planetary gear set may be installed inside the crankshaft pulley such that torque can be increased by the torque increasing device.

For example, when an engine starts, one of three rotary elements of the planetary gear set is restrained to increase torque being input the engine from an integrated starter generator (ISG) whereas when a motor generates electric power, rotational speeds of two rotary elements are made equal to allow the motor to generate electric power at a gear ratio of 1:1.

As a result, it is possible to cope with high engine startup torque and it is also possible to become free from limitation of the maximum rotational speed of the motor at the time of power generation so that breakage of the motor can be prevented.

However, such a torque increasing device requires a bearing between a casing and the planetary gear set to support the planetary gear set. Since the casing is fixed to an engine block, it acts as a rotational resistance body when the engine is operated and, as a result, there is a problem that power generation efficiency is lowered.

As the foregoing described as the background art is just to promote better understanding of the background of the present disclosure, it must not be taken as an admission that it corresponds to the prior art well known to those who have ordinary skill in the art.

SUMMARY

The present disclosure has been made to solve the foregoing problems. The present disclosure is to provide a device for increasing torque of a crankshaft pulley that reduces rotational friction resistance during driving, of an engine and thus prevents power generation efficiency from being decreased.

In one aspect of the present disclosure for accomplishing the object as mentioned above, a device for increasing torque of a crankshaft pulley comprises: a pulley surrounding a crankshaft and connected to engine accessories; a planetary gear set having first, second and third rotary elements wherein the first rotary element is always fixed to the pulley, the second rotary element is always fixed to the crankshaft, and the third rotary element is operated as a selective fixed element; a one-way clutch disposed between the first rotary element and the second rotary element to transmit rotational force only in a direction from the first rotary element to the second rotary element; and a first bearing disposed between the crankshaft and the first rotary element.

The first rotary element surrounds the crankshaft and the first bearing may be disposed between an outer peripheral surface of the crankshaft and an inner peripheral surface of the first rotary element.

The device further comprises an actuator operating to selectively fix the third rotary element wherein an oil casing is provided in a shape of covering the third rotary element, the third rotary element is fixed to an inner surface of the oil casing, a locking gear is formed along a circumferential direction on an outer peripheral surface of the oil casing, and a locking protrusion is provided at an end of the actuator so that the locking protrusion can be selectively engaged with the locking gear by being advanced and retracted according to operation of the actuator.

The oil casing surrounds the second rotary element and a second bearing may be disposed between an inner peripheral surface of the oil casing and an outer peripheral surface of the second rotary element.

A third bearing may be disposed between an outer peripheral surface of the first rotary element and an inner peripheral surface of the second rotary element.

The second rotary element is bolt-fastened to an end of the crankshaft by means of a nut and oil seals may be arranged between the crankshaft and the first rotary element, between the first rotary element and the oil casing, between the oil casing and the second rotary element and between the second rotary element and the nut, respectively.

By the means to solve the problem as mentioned above, the present disclosure has effects as follows:

Since the pulley, the crankshaft and the first bearing are rotated together at the same speed by the one-way clutch at the time of power generation according to driving of the engine, rotational friction resistance is reduced and thus power generation efficiency is prevented from being lowered.

In addition, since the air conditioner can be operated by using the ISG even when the engine is stopped, a mechanical air conditioner compressor rather than an electric air conditioner compressor can be employed, thereby reducing the cost of vehicles.

Furthermore, since startup torque is increased at the crankshaft pulley and thus there is no need to apply high tension to a belt of the ISG, it is possible to prevent high tension from being applied to the whole of engine accessories, thereby enhancing fuel economy by virtue of reduction in the axle load.

Still furthermore, since the rotational speed input to the ISG at the time of power generation can be reduced, and thus, it becomes free from limitation of the maximum rotational speed at the time of power generation, the ISG is prevented from being broken. In addition, since it is possible to realize high startup torque at the time of starting the engine, torque and output of the ISG is reduced and any starter motor can be removed, thereby reducing the cost of vehicles.

BRIEF DESCRIPTION OF THE DRAWINGS

FIG. 1 is a view illustrating an arrangement structure of a device for increasing torque according to an exemplary embodiment of the present disclosure.

FIG. 2 is a detailed view showing an inner structure of a device for increasing torque according to an exemplary embodiment of the present disclosure.

FIG. 3 is a view showing a coupling relationship between a device for increasing torque according an exemplary embodiment of to the present disclosure and an actuator.

FIG. 4 is a speed diagram of a planetary gear set when an engine is started according to an exemplary embodiment of the present disclosure.

FIG. 5 is a speed diagram of a planetary gear set when power generation is operated according to an exemplary embodiment of the present disclosure.

DETAILED DESCRIPTION OF SPECIFIC EMBODIMENTS

Exemplary embodiments of the present disclosure will be described below in detail with reference to the accompanying drawings. However, the present disclosure is not limited or restricted by the preferred embodiments.

A device for increasing torque (also called as "torque increasing device") of a crankshaft pulley according to an exemplary embodiment of the present disclosure comprises a crankshaft 1, a pulley 3, a planetary gear set PG, a first bearing 19 and a one-way clutch 17.

Specifically, referring to FIGS. 1 and 2, the pulley 3 surrounds the crankshaft 1 on the same axis as the crankshaft 1 and connected to engine accessories via a belt 5. In this case, the engine accessories may include, in addition to an integrated starter generator (ISG), a water pump, a generator, a compressor for an air conditioner and the like.

The planetary gear set PG has first, second, and third rotary elements wherein the first rotary element is always fixed to the pulley 3, the second rotary element is always fixed to the crankshaft 1, and the third rotary element can be operated as a selective fixed element.

In this case, the first rotary element is a sun gear S, the second rotary element is a carrier C, and the third rotary element is a ring gear R, wherein the sun gear S may be fixed to the pulley 3 and the carrier C may be fixed to the crankshaft 1.

The one-way clutch 17 is installed between the first rotary element and the second rotary element and transmits rotational force only in a direction from the first rotary element to the second rotary element.

For example, when a rotational speed of the carrier C is faster than that of the sun gear S, the carrier C draws the sun gear S and rotates together by the one-way clutch 17. On the contrary, when a rotational speed of the sun gear S is faster than that of the carrier C, a difference between the rotational speeds of the two rotary elements is allowed by the one-way clutch 17.

Further, the first bearing 19 is installed between the crankshaft 1 and the first rotary element and acts to bear load applied in a rotating direction.

More specifically, the sun gear S that is the first rotary element is installed in a shape of surrounding the crankshaft 1 and the first bearing 19 may be supported between an outer peripheral surface of the crankshaft 1 and an inner peripheral surface of the first rotary element.

In other words, as the pulley 3 is connected to engine accessories via the belt 5, eccentric load is applied to the sun gear S by tension of the belt wherein the eccentric load is supported by the first bearing 19, and also the pulley 3, the crankshaft 1 and the first bearing 19 are rotated together at the same speed by the one-way clutch 17 at the time of power generation according to driving of the engine, so that rotational friction resistance is reduced and thus power generation efficiency is prevented from being lowered.

In addition, as shown in FIGS. 2 and 3, the present disclosure may further comprise an actuator 13 that operates to selectively fix the ring gear R that is the third rotary element.

The actuator 13 may be fixed to an engine block 11 and may be configured to include a locking protrusion 15 that is operated in a linear direction when a controller applies electric power thereto by using a solenoid coil or the like.

More specifically, an oil casing 7 is provided in a shape of covering an outer peripheral surface of the ring gear R wherein the ring gear R is fixed to an inner peripheral surface of the oil casing 7. In this case, the inside of the oil casing 7 is filled with oil.

In addition, a locking gear 9 is formed along a circumferential direction on an outer peripheral surface of the oil casing 7 and a locking protrusion 15 is provided at an end of the actuator 13 so that the locking protrusion 15 can be selectively engaged with the locking gear 9 by being advanced and retracted according to operation of the actuator 13.

In other words, when the locking protrusion 15 is advanced according to operation of the actuator 13, the locking protrusion 15 is fastened to the locking gear 9 and then rotation of the ring gear R is restricted, and as a result, operation force of the ISG is input to the sun gear S fixed to the pulley 3 and then output to the crankshaft 1 fixed to the carrier, thereby starting the engine.

Also, when the locking projection 15 is retracted, the locking projection 15 is released from the locking gear 9 so that the ring gear R becomes rotatable and, as a result, driving force of the engine can be transmitted to engine accessories through the pulley 3.

Further, in this embodiment of the present disclosure, the oil casing 7 is provided in a shape of surrounding the carrier C that is the second rotary element and a second bearing 21 is installed between an inner peripheral surface of the oil casing 7 and an outer peripheral surface of the second rotary element to bear load applied in a rotating direction.

Further, the crankshaft 1 and the carrier C that is the second rotary element are bolt-fastened by means of a nut 25 and a third bearing 23 is installed between an outer peripheral surface of the sun gear S and an inner peripheral surface of the carrier C to bear load applied in a rotating direction.

In addition, oil seals 27 are provided between the crankshaft 1 and the sun gear S, between the sun gear S and the oil casing 7, between the oil casing 7 and the carrier C and between the carrier C and the nut 25, respectively such that oil in the oil casing 7 cannot leak out.

Accordingly, by providing the oil seals 27 at the positions as mentioned above, the oil seals 27 also rotate together with the crankshaft 1 at the same speed by the one-way clutch 17 at the time of power generation according to driving of the engine so that rotational friction generated on the oil seals 27 is removed and thus power generation efficiency is prevented from being lowered.

FIG. 4 shows a speed diagram of the planetary gear set PG at the time of startup of the engine. When the ISG is driven while the actuator 13 is operated to restrain the ring gear R, driving force of the ISG is transmitted to the pulley 3 via the belt 5 and input through the sun gear S and then the driving force input to the sun gear S is decelerated and output through the carrier C and transmitted to the crankshaft 1 so that startup torque can be increased.

FIG. 5 shows a speed diagram of the planetary gear set PG during power generation by the engine. When the crankshaft 1 of the engine rotates in a state that the actuator 13 is operated so as not to restrain the ring gear R, the sun gear S is rotated at the same speed as the carrier C by the one-way clutch 17 because the rotational speed of the carrier C rotating together with the crankshaft 1 is faster than that of the sun gear S, so that it is possible to generate electric power through the ISG connected to the belt 5.

As discussed above, according to the exemplary embodiment of the present disclosure, since the pulley 3, the crankshaft 1 and the first bearing 19 are rotated together at the same speed by the one-way clutch 17 at the time of power generation according to driving of the engine, rotational friction. resistance is reduced and thus power generation efficiency is prevented from being lowered.

In addition, when releasing the actuator 13 and driving the ISG while the engine is stopped, the ring gear R rotates reversely and engine accessories, such as an air conditioner, rotates together with the ISG because the engine is stopped. Accordingly, since the air conditioner can be operated by using the ISG even when the engine is stopped, a mechanical air conditioner compressor rather than an electric air conditioner compressor can be employed, thereby reducing the cost of vehicles.

Furthermore, in the case of constructing the torque increasing device in an ISG integrated type, tension of the belt 5 must be high in order to cope with high startup torque and high tension is applied to the whole of engine accessories. On the contrary, according to the embodiment of the present disclosure, since startup torque is increased at the crankshaft pulley and thus there is no need to apply high tension to the belt, it possible to prevent high tension from being applied to the whole of engine accessories, thereby enhancing fuel economy by virtue of reduction in the axle load.

Still furthermore, since the rotational speed input to the ISG at the time of power generation can be reduced and thus it becomes free from limitation of the maximum rotational speed of the motor at the time of power generation, the motor is prevented from being broken. In addition, since it is possible to realize high startup torque at the time of starting the engine, torque and output of the ISG is reduced and any starter motor can be removed, thereby reducing the cost of vehicles.

Although the present disclosure has been described in detail only with reference to specific embodiments as mentioned above, it will be apparent to those skilled in the art that various changes and modifications can be made within the spirit and scope of the invention and it is natural that those changes and modifications are fallen within the scope of the appended claims.

What is claimed is:

1. A device for increasing torque of a crankshaft pulley, the device comprising:
   a pulley surrounding a crankshaft and connected to engine accessories;
   a planetary gear set having first, second, and third rotary elements, wherein the first rotary element is always fixed to the pulley, the second rotary element is always fixed to the crankshaft, and the third rotary element is operated as selective fixed element;
   a one-way clutch disposed between the first rotary element and the second rotary element to transmit rotational force only in a direction from the first rotary element to the second rotary element; and
   a first bearing disposed between the crankshaft and the first rotary element,
   wherein the first rotary element surrounds the crankshaft, and wherein the first bearing is disposed between an outer peripheral surface of the crankshaft and an inner peripheral surface of the first rotary element.

2. The device of claim 1, further comprising: an actuator selectively fixing the third rotary element;
   an oil casing covering the third rotary element which is fixed to an inner surface of the oil casing;
   a locking gear arranged along a circumferential direction on an outer peripheral surface of the oil casing; and
   a locking protrusion at an end of the actuator, wherein the locking protrusion is selectively engaged with the locking gear by advancing and retracting according to operation of the actuator.

3. The device of claim 2, further comprising a second bearing is disposed between an inner peripheral surface of the oil casing and an outer peripheral surface of the second rotary element, wherein the oil casing surrounds the second rotary element.

4. The device of claim 2, further comprising a plurality of oil seals arranged between the crankshaft and the first rotary element, between the first rotary element and the oil casing, between the oil casing and the second rotary element, and between the second rotary element and the nut, respectively, wherein the second rotary element is bolt-fastened to an end of the crankshaft by a nut.

5. The device of claim 1, further comprising a third bearing disposed between an outer peripheral surfaces of the first rotary element and an inner peripheral surface of the second rotary element.

* * * * *